United States Patent Office 3,040,071
Patented June 19, 1962

3,040,071
PROCESS FOR THE HYDROGENOLYSIS OF 16-BROMO-17α-HYDROXY-STEROIDS
William Graham, Greenford, and Alexander Crawford Ritchie and Lewis Aubrey Wetherill, Harrow, England, assignors to Glaxo Laboratories Limited, Greenford, England, a British company
No Drawing. Filed Dec. 22, 1958, Ser. No. 781,936
Claims priority, application Great Britain Dec. 31, 1957
14 Claims. (Cl. 260—397.45)

This invention is concerned with improvements in or relating to the preparation of 17α-hydroxy-20-keto-steroids from 16-bromo-17α-hydroxy-20-keto-steroids and more particularly with the preparation of 17α-hydroxy-20-keto-pregnane and allopregnane compounds.

Various steroid substances of physiological interest, particularly steroids having adreno-cortical activity, are characterised by containing a keto group in the 20-position and a hydroxy group at the 17-position in the α configuration. One of the problems associated with the synthesis of such steroids is the introduction into the molecule of the 17α-hydroxy group. Thus, for example, one method for accomplishing this step is described in British patent specifications Nos. 739,591 and 739,592.

A further procedure for the production of 17α-hydroxy-20-keto-steroids has been proposed starting from $\Delta^{16}$-20-keto steroids, according to which method the $\Delta^{16}$ compound is converted to a 16-bromo-17α-hydroxy-20-keto compound (e.g. by epoxidation followed by treatment of the epoxide with hydrogen bromide) which is then dehalogenated to the desired 17α-hydroxy-20-keto compound. This series of reactions, as applied to pregnane and allopregnane compounds, may be represented schematically as follows:

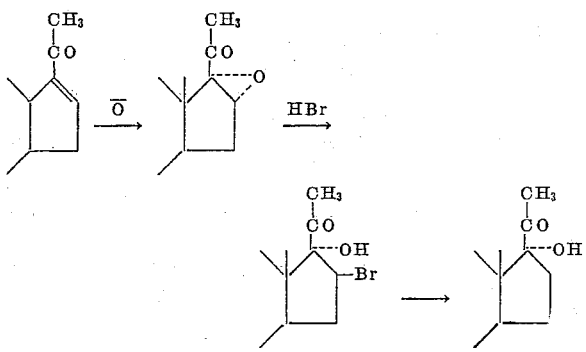

However, the step of dehalogenating the 16-bromo intermediate in this series of reactions has caused some difficulty in practice; thus, for example, one method of effecting this step is to heat the 16-bromo compound with Raney nickel but this method requires large quantities of the catalyst (some six times the weight of the steroid used), whilst the catalyst itself is tedious and hazardous to make on the large scale and, for this reaction, is desirably prepared in a specially deactivated form.

Attention has also been directed to carrying out the desired dehalogenation by hydrogenolysis using a supported noble metal catalyst, particularly a supported palladium catalyst, but such processes have been found to be erratic giving non-uniform products and/or poor yields.

It is thus an object of this invention to provide improvements in the process of dehalogenation of 16-bromo-17α-hydroxy-20-keto steroids to yield 17α-hydroxy steroids by hydrogenolysis in the presence of a noble metal catalyst; viz. palladium.

In investigations we have carried out into the stated hydrogenolysis reaction, we have discovered that the obtaining of non-homogeneous products and/or poor yields may be caused by one or both of two eventualities. Thus, we find that under certain conditions, the reaction becomes quickly inhibited, possibly due to catalyst poisoning, with the result that the product obtained may be contaminated with, or in sometimes consist solely of unreacted 16-bromo compound. Under other conditions, we find that the desired reaction product is contaminated with a 16:17-epoxy steroid, formed in a side-reaction. The purification of the desired 17α-hydroxy compound from 16:17-epoxide and/or unchanged 16-bromo compound presents considerable difficulty.

In order to reduce contamination of the products by one or both of the above stated contaminants, we have found that essentially two conditions must be met. Firstly, the reaction must be carried out under acid conditions, i.e at a pH less than 7, since at pH's greater than 7 epoxide formation sets in. Secondly, to avoid inhibition of the reaction, the acidity of the reaction medium must be controlled and the concentration of hydrogen ions not be allowed to become too high.

Thus, we carry out the desired hydrogenolysis reaction such that the reaction is maintained weakly acidic during the reaction. Since hydrogen bromide is produced during the reaction, it is, of course, necessary to have present in the medium a substance or substances which will act in the manner of a buffer to prevent the reaction medium becoming unduly acidic.

According to the invention, therefore, there is provided a process for the debromination of 16-bromo-17α-hydroxy steroids to yield 17α-hydroxy steroids by hydrogenolysis in the presence of a palladium catalyst in which the reaction is carried out in a polar solvent medium, preferably methanol, the reaction mixture being maintained weakly acidic i.e. at an apparent pH, as measured directly on the reaction mixture by a pH meter having a glass electrode, within the range of 4.0 to 6.0 and preferably within the range of from about 4.3 to 6.0. Thus we prefer to commence the reaction at a pH in the range of 5 to 6 and terminate it at a pH in the range of 4.3 to 4.8. Excellent results have been achieved by commencing at a pH of about 5.4 and terminating at a pH of about 4.3.

It is preferred to maintain the desired pH conditions by means of a weak acid and, as buffer, a salt of a weak base and a weak acid.

The choice of solvent medium, acid and salt is to some extent limited by solubility considerations since it is necessary to use a solvent medium which will dissolve the steroid starting material and to select a salt of a weak acid and weak base soluble therein. As liquid medium, we thus prefer to use a lower alkanol e.g. methanol or ethanol. We particularly prefer to use methanol since this solvent has given outstanding results. Whilst ethanol and mixtures of methanol and ethanol e.g. industrial methylated spirits may be used, these solvents do not give such good results.

The solvent medium should as stated be polar and should be relatively inert i.e. it should not be affected by the other reagents and the hydrogen bromide developed in the reaction.

Unfortunately the solubility of steroids in lower alkanols is relatively low. However the concentration may be increased by using a further solvent having a relatively greater solvent power for steroids. Examples of such further solvents include halogenated hydrocarbons e.g. methylene chloride or chloroform. We particularly prefer to use methylene chloride for this purpose. The use of further solvents requires care. The further solvent should also be relatively inert and this precludes the use of ether solvents such as dioxan and tetrahydrofuran which react with hydrogen bromide formed during the reaction and hence unduly influence the pH of the reaction.

We prefer to achieve weakly acidic conditions by the presence of a weak organic acid especially a lower alkanoic acid such as formic acid, acetic acid, propionic acid, etc. As "buffer salt" we prefer to use ammonium acetate but other salts which may be used include other ammonium salts of weak organic acids, e.g. formic acid, propionic acid etc., as well as corresponding organic base salts, such as the lower alkylamine salts.

Thus other salts which may be used include salts of acetic acid or formic acid with triethylamine or morpholine. The choice of salt is limited by its solubility in the solvent medium and some salts which might otherwise be suitable for the process according to the invention have to be discarded for this reason. If sufficient concentration of salt is not achieved it may not be possible to obtain suitable pH values.

It should be noted that in practice the salt should preferably be added to the reaction mixture just before hydrogenolysis begins since otherwise a 16:17-epoxy steroid may be formed in significant proportions.

Preferably the salt is used in an amount up to 1.2 molar equivalents of the steroid reactant i.e. in slight excess. Increased quantities e.g. 1.75-2.4 molar equivalents lead to the production of 16:17-epoxy steroids.

The preferred catalyst for the process of the present invention is palladium supported upon an inert carrier, particularly, palladised charcoal or kieselguhr; other supports which may be used include barium sulphate, silica gel, etc. The support used should, of course, be inert to acid and thus the use of calcium carbonate is generally undesirable. The support should also be substantially neutral in character.

The use of palladium in an unsupported state requires care. It is however possible to use satisfactorily a finely-divided slurry of precipitated palladium oxide in methanol, for example obtained by removing water from the precipitated oxide by methanol.

The ratio of palladium to steroid may vary within wide limits. Thus one may use ratios of 10% w/w (as palladium oxide) and lower. Ratios of 5-7.5% w/w have been found to give good results.

The hydrogenolysis is conveniently carried out at substantially atmospheric pressure. To obtain rapid uptake of hydrogen and efficient hydrogenolysis it is advisable to keep the reaction mixture well agitated. If the reagents are carefully selected the pH of the solution after hydrogenolysis should be in the range of 4.3-4.8.

The process according to the invention is preferably conducted without heat supply. It is not advisable to use external heating because of the risk of epoxide formation. The hydrogenolysis is in any case mildly exothermic.

By proceeding according to the invention the desired 17-hydroxy compound is obtained in good yield i.e. it contains little unchanged 16-bromo compound and little 16:17-epoxy compound as a by-product. By measuring the rotation and the bromine content of the end-product the relative proportions of these three substances may be assessed.

The process according to the invention is especially applicable to the production of 17α-hydroxy-20-keto pregnanes and allopregnanes, particularly to the hydrogenolysis of 3β-acyloxy-16β-bromo-17α-hydroxy-5α or β-pregnane-11:20-diones to the corresponding 17α-hydroxy compounds. The application to such compounds of the 5α series is particularly useful having regard to their utility as intermediates in the synthesis of cortical hormones from various sapogenins e.g. hecogenin. Preferred starting materials are 3β-acetoxy-16β-bromo-17α-hydroxy-5α-pregnane-11:20-dione and the corresponding 3β-propionyloxy- and 3β-benzoyloxy compounds as well as the 3β-hydroxy compound.

The invention is of particular value in the preparation of compounds of the general formula

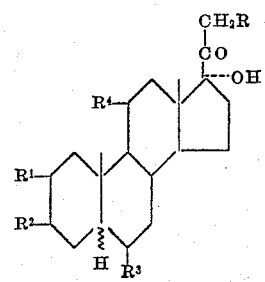

where R is a hydrogen atom or an acyloxy group.

$R^1$ and $R^3$ which may be the same or different are alkyl e.g. methyl groups or hydrogen atoms, $R^2$ is an acyloxy group or a ketonic oxygen atom and $R^4$ is a hydroxyl or acyloxy group or a ketonic oxygen atom or a hydrogen atom, from the corresponding 16-bromo compounds. The compounds of the above general formula therefore represent useful intermediates for the preparation of compounds having adreno cortical activity.

For the further explanation of the invention a preferred method of operation will now be described by way of example only:

The 16-bromo starting material may be obtained in any convenient way, for example as described in British patent specification No. 739,139 or in U.S. Patents Nos. 2,602,804 and 2,733,240.

The starting material is then dissolved in the reaction medium which preferably comprises methanol containing glacial acetic acid. Preferably the acid forms from 2-10% of the liquid medium, desirably 5%. Ammonium acetate is also added preferably in an amount equivalent to a slight excess over the steroid reactant. The initial apparent pH of the medium as measured directly on the solution with a pH meter should be within the range of from 5.0-6.0, preferably 5.4.

The resultant solution is then hydrogenated preferably at atmospheric pressure and room temperature in the presence of a palladised charcoal catalyst or palladised kieselguhr; the catalyst can be prepared in various ways, for example as described hereinafter.

After hydrogen uptake ceases, the reaction may be regarded as complete, at which point the pH should be at least 4 and preferably 4.3-4.8, and the product isolated as described, for example as described in the examples hereinafter.

For the bettering understanding of the invention, the following examples are given only as illustrations. The 10% palladium or charcoal catalyst used in the examples was prepared in the following manner:

Palladium chloride (6.4 g.) in concentrated hydrochloric acid (32 ml.) was diluted with water (1.15 l.) and acid washed charcoal, (34.15 g.) was added with stirring. Aqueous sodium hydroxide was added to neutralise the acid and the resulting suspension was stirred for 2 hrs. The palladised charcoal was filtered off, washed copiously with water and dried at 60° C. Palladised gieselguhr and palladised barium sulphate can be prepared in similar manner.

EXAMPLE 1

3β - acetoxy - 16β - bromo - 17α - hydroxy - 5α - pregnane-11:20-dione (2.0 g., M.P. 220-2° Cd) in methanol (200 ml.) containing glacial acetic acid (10 ml.) and ammonium acetate (0.4 g.) was hydrogenated over 10% palladium on charcoal (1.5 g.) as catalyst at atmospheric pressure and temperature. The initial "pH" of the mixture was 5.1. The hydrogen uptake stopped after 30 mins. (volume of uptake 180 ml.), the catalyst was filtered off and washed well with methylene chloride (2 x 25 ml.). The filtrate and washings were bulked and the resulting solution distilled down to dryness under reduced pressure. The residue was dissolved in methylene chloride (20 ml.) and the inorganic salts removed by washing with N-hydrochloric acid (1 x 20 ml.) water (1 x 20 ml.) saturated aqueous sodium bicarbonate solution (1 x 20 ml.) and water (1 x 20 ml.) each aqueous layer being backwashed with methylene chloride (20 ml.). The extract and the back wash were bulked and the solution distilled to dryness under reduced pressure. The residue was dissolved in boiling methanol (50 ml.) and the solvent distilled off under reduced pressure. The residual white solid was 3β-acetoxy-17α-hydroxy-5α-pregnane-11:20-dione identical with authentic material.

Yield: 1.64 g. (99% theory), M.P. 170–2° C., $[\alpha]_D^{20} = +13.5°$ (1% in CHCl₃), percent Br=<0.2%.

EXAMPLE 2

3β - acetoxy - 16β - bromo - 17α - hydroxy - 5α - pregnane-11:20-dione (30 g., M.P. 220–22° Cd) in methanol (1.5 l.) containing acetic acid (75 ml.), and methylene chloride (90 ml.) was hydrogenated over 10% palladium on charcoal (22.5 g.) in the presence of ammonium acetate (6.0 g.). The initial "pH" of the mixture was 5.4. Hydrogen uptake (2.44 l.) was complete in 1 hr. The reaction mixture was worked up as in Example 1.

Yield: 23.5 g. (94.5%), M.P. 170–3° C. $[\alpha]_D^{20} = +13.7°$ (1% in CHCl₃), percent Br=<0.1.

EXAMPLE 3

3β - acetoxy - 16β - bromo - 17α - hydroxy - 5α - pregnane-11:20-dione (2 g., M.P. 220–22° Cd) in methanol (50 ml.) containing acetic acid (2 ml.) and methylene chloride (10 ml.) was hydrogenated in the presence of ammonium acetate (0.4 g.) using 10% palladium on charcoal (1.5 g.) as catalyst. The initial "pH" of the mixture was 5.9. Hydrogen uptake (180 ml.) stopped after 1 hr. The product was isolated as in Example 1.

Yield: 1.59 g. (96%), M.P. 169–72° C. $[\alpha]_D^{20} = +13°$ (1% in CHCl₂), percent Br=<0.3%.

EXAMPLE 4

3β - acetoxy - 16β - bromo - 17α - hydroxy - 5α - pregnane-11:20-dione (2 g., M.P. 220–2° Cd) in methanol (100 ml.) containing methylene chloride (6 ml.) ammonium acetate (0.4 g.) and formic acid (0.5 ml.) was hydrogenated over 10% palladium on charcoal (1.5 g.). The initial "pH" of the reaction mixture was 5.4. The product was isolated as in Example 1.

Yield: 1.59 g. (96.0% of theory), M.P. 167–70° C. $[\alpha]_D^{20} = +13°$ (1% in CHCl₃), Br=<0.2%.

EXAMPLE 5

3β - acetoxy - 16β - bromo - 17α - hydroxy - 5α - pregnane-11:20-dione (2 g., M.P. 220–2° Cd) in methanol (100 ml.) containing methylene chloride (6 ml.) ammonium acetate (0.4 g.) and propionic acid (14 ml.), was hydrogenated over 10% palladium on charcoal (1.5 g.). The initial "pH" of the reaction mixture was 5.4. The product was isolated as in Example 1.

Yield: 1.58 g. (95.2%), M.P. 167–70° C. $[\alpha]_D^{20} = +12°$ (1% in CHCl₃), Br=<0.2%.

Examples 6–50 illustrate the use of various salts, acids, catalysts etc. The "bromohydrin" used as starting material was 3β-acetoxy-16β-bromo-17α-hydroxy-5α-pregnane 11:20-dione and, unless otherwise stated, the reactants used were as follows in the stated proportions:

Bromohydrin _____ g__ 2
Glacial acetic acid _____ ml__ 5
Ammonium acetate _____ g__ 0.4
Palladised charcoal _____ g__ 1.5
Methanol _____ ml__ 100
Methylene chloride _____ ml__ 6

The reaction conditions employed were substantially similar to those described in Example 1.

Variation in Amount of Acid Used

A series of preparations were carried out to show the effect of varying the amount of acetic acid used in the reaction mixture. The results of these preparations are shown in Table 1. 200 mls. of methanol were employed in each example but no methylene chloride was present.

TABLE 1

| Example No. | Acetic acid, Percent | Product | | | | Estimated composition | | |
|---|---|---|---|---|---|---|---|---|
| | | Yield, Percent | M.P., °C. | $[\alpha]_D$, Degrees | Percent Br | 17-OH compound | Epoxide | Bromohydrin |
| 6 | 2.5 | 97 | 163–7 | +14 | 0.4 | 97 | | 3 |
| 7 | 5 | 99 | 163–8 | +13.5 | | 100 | | |
| 8 | 10 | 95 | 154–9 | +18 | 0.5 | 90 | 7 | 3 |
| 9 | 20 | 112 | 148–200 | +25.6 | 8.5 | 47 | 3 | 50 |

It will be seen from the table that the addition of 5% acetic acid gave virtually quantitative yields of very good quality of 3β-acetoxy-17α-hydroxy-5α-pregnane-11:20-dione. It will be seen from this table that the use of 2.5% and 10% acetic acid give high yields of the 17-hydroxy compound although not so good as that obtained using 5% acetic acid. The starting pH conditions for 2.5% and 10% acetic acid were respectively 5.8 and 5.1.

Concentration of Reaction

Next a series of preparations were carried out to demonstrate the effect of varying the concentration of steroid in the reaction mixture. In each case a further solvent was added to increase the steroid concentration. The results are shown in Table 2. The ratio of methanol to acetic acid in each case was 20:1 (as measured in ml.).

TABLE 2

| Example No. | MeOH, ml. | CH₂Cl₂, ml. | Starting pH | Product M.P., °C. | Estimated Composition | | |
|---|---|---|---|---|---|---|---|
| | | | | | 17-OH compound | Epoxide | Bromohydrin |
| 10 | 100 | 6 | 5.4 | 164–9 | 98 | | 2 |
| 11 | 50 | 10 | 5.75 | 164–9 | 98 | | 2 |
| 12 | 50 | 10 | 5.9 | 160–5 | 97 | 2 | 1 |
| 13 | ¹750 | 150 | 5.9 | 162–6 | 97 | 3 | |
| 14 | 30 | 30 | | 150–8 | 90 | | 10 |
| 15 | 50 | 10 | ²5.3 | 162–6 | 96 | | 4 |
| 16 | 100 | 6 (CHCl₃) | 5.9 | 156–60 | 89 | 11 | |

¹ 30 g. bromohydrin used.
² Adjusted to this pH with extra acetic acid.

These results show that one can still obtain a high yield of 17-hydroxy compound at higher steroid concentrations although, as stated above, the concentration must not be allowed to become too high otherwise the further solvent exerts an influence on the pH of the reactants, the effect of which may be difficult to control.

*Quantity of Catalyst*

In Table 3 we show the effect of varying the quantity of palladised charcoal on the hydrogenolysis.

TABLE 3

| Example No. | 10% PdO/C, g. | MeOH, (ml.) | CH$_2$Cl$_2$, (ml.) | Acetic (ml.) acid, | 17-Hydroxy compound | |
|---|---|---|---|---|---|---|
| | | | | | $[\alpha]_D$ Degrees | M.P., °C. |
| 17 | 1.5 | 100 | 6 | 5 | +12.3 | 164–9 |
| 18 | 0.5 | 100 | 6 | 5 | +14 | 161–4 |
| 19 | 0.75 | 100 | 6 | 5 | +14 | 163–6 |
| 20 | 1.5 | 50 | 10 | 2 | +13 | 164–9 |
| 21 | 0.5 | 50 | 10 | 2 | +17 | 154–61 |
| 22 | 1.0 | 50 | 10 | 2 | +14.4 | 160–5 |

The results of Table 3 show that a catalyst proportion of 7.5% (calculated on the weight ratio of palladium oxide to steroid) gave a product with satisfactory rotation and melting point. Reduction of the catalyst concentration from 7.5% to 2.5% brought about a fall in the quality of the product. This fall in quality is emphasized by increasing the concentration of the steroid in the reaction mixture. Likewise, the effect of varying the quantity of 10% palladium oxide on kieselguhr is demonstrated in Table 4.

*Quantity of Salt*

The effect of varying the quantity of salt used was then assessed and the results obtained are set out in Table 6.

TABLE 6

| Example No. | Ammonium acetate, g. | Initial pH | 17-Hydroxy-3-acetate | | Remarks |
|---|---|---|---|---|---|
| | | | $[\alpha]_D$ Degrees | M.P. °C. | |
| 36 | 0.2 | 5.3 | +21.6 | 146–52 | Final pH 1.5, 64% bromohydrin present. |
| 37 | 0.4 | 5.4 | +11.5 | 166–9 | Standard. |
| 38 | 0.6 | 5.6 | +14.2 | 161–70 | |
| 39 | 0.8 | 5.9 | +16.4 | 155–64 | 10% epoxide present. |

It will be seen from Table 6 that Example 37 gave optimum results. In this example 1.2 molar equivalents of ammonium acetate were used giving an initial pH of 5.4 and a final pH of 4.5. Reduction of the ammonium acetate to 0.6 molar equivalents resulted in much unchanged bromohydrin due to poisoning of the catalyst at the lowered final pH of 1.5 produced by excess hydrogen bromide. Increased quantities of salt give rise to the production of epoxide by ring closure of the bromohydrin.

*Use of Other Salts*

Ammonium hydrogen succinate and ammonium for-

TABLE 4

[Variations of quantity of 10% PdO/kieselguhr in hydrogenolysis]

| Example No. | Bromo-hydrin, g. | Methanol, mls. | CH$_2$Cl$_2$, mls. | Acetic acid, mls. | Ammonium Acetate, g. | 10% PdO/kieselguhr catalyst wt. g. | 17-Hydroxy-3-acetate | | |
|---|---|---|---|---|---|---|---|---|---|
| | | | | | | | Percent Yield | $[\alpha]_D$ Degrees | M.P., °C. |
| 23 | 2 | 100 mls | 6 | 5 | 0.4 | 1.5 | 100 | +13 | 166–70 |
| 24 | 2 | 100 mls | 6 | 5 | 0.4 | 1.0 | 100 | +11.3 | 165–8 |
| 25 | 2 | 100 mls | 6 | 5 | 0.4 | 0.75 | 100 | +13.6 | 165–7 |
| 26 | 2 | 100 mls | 6 | 5 | 0.4 | 0.5 | 100 | +13 | 165–8 |
| 27 | 2 | 100 mls | 6 | 5 | 0.4 | 0.3 | 100 | +14 | 158–62 |
| 28 | 20 | 1 l | 60 | 50 | 4 | 5 | 100 | +13.5 | 165–8 |

The variation in hydrogenolysis reaction concentrations using palladised kieselguhr is shown in Table 5.

mate may be used in place of ammonium acetate. The results obtained using these salts are shown in Table 7.

TABLE 5

| Example No. | Bromo-hydrin, g. | Methanol, mls. | CH$_2$Cl$_2$, mls. | Acetic acid, mls. | Ammonium Acetate, g. | 10% PdO/kieselguhr, g. | 17-Hydroxy-3-acetate | | | Remarks |
|---|---|---|---|---|---|---|---|---|---|---|
| | | | | | | | Percent Yield | $[\alpha]_D$ Degrees | M.P. °C. | |
| 29 | 2 | 50 | 6 | 2.6 | 0.4 | 1.5 | 100 | +13.3 | 166–70 | |
| 30 | 2 | 20 | 4 | 2.8 | 0.4 | 1.5 | 100 | +16 | 144–60 | Final pH 4.3. |
| 31 | 2 | 25 | 3 | 2.8 | 0.4 | 1.5 | 100 | +13 | 162–5 | Final pH 4.05. |
| 32 | 2 | 25 | 3 | 1.2 | 0.4 | 1.5 | 100 | +12.2 | 164–8 | Final pH 4.6. |
| 33 | 2 | *25 | | 1.2 | 0.4 | 1.5 | 100 | +11.6 | 162–5 | Final ph 4.55. |
| 34 | 20 | 500 | 60 | 26 | 4 | 15 | 100 | +13.5 | 167–9 | |
| 35 | 20 | 250 | 30 | 12 | 4 | 15 | 97 | +11.0 | 167–70 | |

* Reaction in suspension.

TABLE 7

| Example No. | Added salt (1.2 molar equivalents) | 17-Hydroxy-3-acetate | | Remarks |
|---|---|---|---|---|
| | | [α]D, Degrees | M.P., °C | |
| 40 | Ammonium hydrogen succinate. | +12.1 | 166–70 | Initial pH 5.4. Final pH 4.85. |
| 41 | Ammonium formate. | +11.9 | 166–70 | Initial pH 5.4. Final pH 4.6. |

In place of ammonium salts one can use other weak base salts which may be formed in situ. Table 8 shows the use of amine salts each of which were formed in situ.

TABLE 8

| Example No. | Added base (1.2 equivalents) | Added acid | Vol., mls. | Initial pH | Final pH | 17-Hydroxy-3-acetate | |
|---|---|---|---|---|---|---|---|
| | | | | | | [α]D, Degrees | M.P., °C |
| 42 | Triethylamine. | acetic. | 6.3 | 5.4 | 4.5 | +14.7 | 164–8 |
| 43 | ....do.... | formic. | 1 | 5.4 | 4.7 | +13.8 | 166–70 |
| 44 | Morpholine. | acetic. | 5.6 | 5.4 | 4.45 | +11.1 | 165–8 |

Acids Other Than Acetic Acid

Table 9 shows that other acids can be used satisfactorily in place of acetic acid. The use of formic acid is also shown in Example 43 in Table 8.

TABLE 9

| Example No. | Added acid | Vol., mls. | Initial pH | 17-Hydroxy-3-acetate | |
|---|---|---|---|---|---|
| | | | | [α]D, Degrees | M.P., °C |
| 45 | Formic | 0.5 | 5.4 | +13.3 | 163–6 |
| 46 | Propionic | 14.4 | 5.4 | +11.2 | 163–7 |

Use of Other Catalysts

Various forms of palladium catalyst may be used. Palladium black and palladium oxide were shown to give products containing too much unchanged bromohydrin to be of value. Table 10 shows the results obtained using other catalysts.

TABLE 10

| Example No. | Catalyst | Wt., g. | 17-Hydroxy-3-acetate | | | |
|---|---|---|---|---|---|---|
| | | | [α]D, Degrees | M.P., °C | Yield, percent | |
| 47 | PdO (Methanol slurry) | 0.30 | +14.2 | 164–8 | 98 | |
| 48 | 10% PdO/Kieselguhr | 1.5 | +11.8 | 167–70 | 100 | |
| 49 | 10% PdO/BaSO₄ (B.P.) | 1.5 | +13.5 | 163–9 | 100 | |
| 50 | 10% PdO/BaSO₄ (X-ray) | 1.5 | +11.5 | 164–8 | 100 | |

EXAMPLE 51

*Use of Industrial Methylated Spirits in Place of Methanol*

3β - acetoxy - 16β - bromo - 17α - hydroxy - 5α - pregnane-11:20-dione (2.0 g.) in industrial methylated spirits (100 ml.) containing glacial acetic acid (7.9 ml.) and ammonium acetate (0.4 g.) was hydrogenated over 10% palladium on charcoal (1.5 g.) as catalyst at atmospheric pressure and room temperature. The initial pH of the mixture was 5.3 and the final pH 4.45. The reaction was thereafter conducted and the product isolated as in Example 1.

Yield: 1.6 g. (96%), [α]D +18.7°, M.P. 146–167° C.

Estimated composition:
  87% 17-hydroxy-3-acetate
  17% unchanged bromohydrin.

We claim:

1. In a hydrogenolysis process for the debromination of a 16β-bromo-17α-hydroxy steroid of the allopregnane series to yield the corresponding 17α-hydroxy steroid wherein said 16β-bromo-17α-hydroxy steroid is contacted with hydrogen in a reaction medium comprising an inert polar solvent and in the presence of a palladium catalyst, the step of maintaining said reaction medium during hydrogenolysis at an apparent pH, as measured directly on the reaction mixture by a pH meter having a glass electrode, within the range of 4.0 to 6.0.

2. A process as claimed in claim 1 in which the reaction is maintained at an apparent pH within the range of from about 4.3 to 6.0.

3. A process as claimed in claim 1 in which the reaction is commenced at an apparent pH within the range of 5 to 6 and is terminated at a pH in the range of 4.3 to 4.8.

4. A process as claimed in claim 3 in which the reaction is commenced at a pH of about 5.4 and terminated at a pH of about 4.3.

5. A process as claimed in claim 1 in which the pH conditions are maintained by means of a lower alkanoic acid and a salt of a lower alkanoic acid and a weak base selected from the group consisting of ammonia and an amine.

6. A process as claimed in claim 5 in which the polar solvent is methanol.

7. A process as claimed in claim 5 in which the lower alkanoic acid is selected from the group consisting of formic acid, acetic acid and propionic acid.

8. A process as claimed in claim 5 in which the salt is ammonium acetate.

9. A process as claimed in claim 1 in which the palladium catalyst comprises palladium supported on an inert carrier.

10. A process as claimed in claim 9 in which the inert carrier is selected from the group consisting of charcoal and kieselguhr.

11. A process as claimed in claim 1 in which the reaction medium also contains methylene chloride as a solvent for the steroid.

12. A process as claimed in claim 1 in which the 16-bromo-17α-hydroxy steroid is a 3β-acyloxy-16β-bromo-17α-hydroxy-5α-pregnane-11:20-dione.

13. A process as claimed in claim 12 in which the 16-bromo-17α-hydroxy steroid is 3β-acetoxy-16β-bromo-17α-hydroxy-5α-pregnane-11:20-dione.

14. A process as claimed in claim 1 in which the 16-bromo-17α-hydroxy steroid has the formula

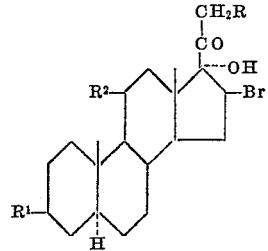

where R is selected from the group consisting of a hydrogen atom and an acyloxy group, R¹ is selected from the group consisting of a keto group and acyloxy group, and R² is selected from the group consisting of a keto group, a hydroxyl group and a hydrogen atom.

References Cited in the file of this patent

UNITED STATES PATENTS

| 2,805,230 | Stork et al. | Sept. 3, 1957 |
| 2,863,862 | Djerassi et al. | Dec. 9, 1958 |
| 2,932,639 | Oliveto et al. | Apr. 12, 1960 |